United States Patent Office 3,302,500
Patented Feb. 7, 1967

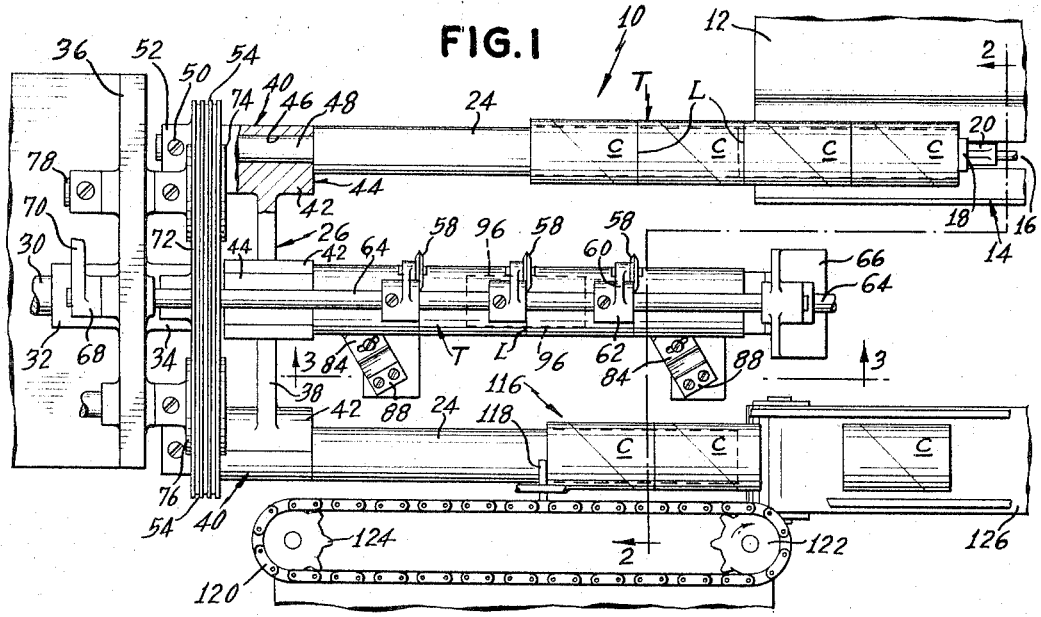
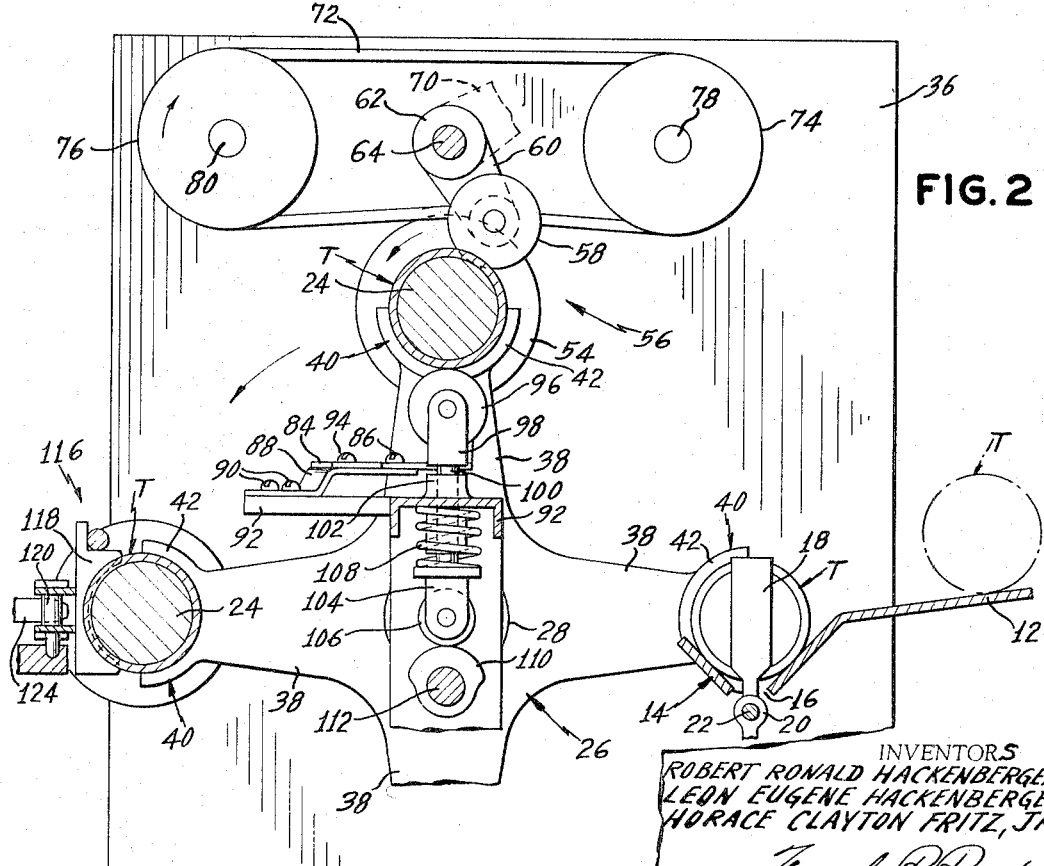

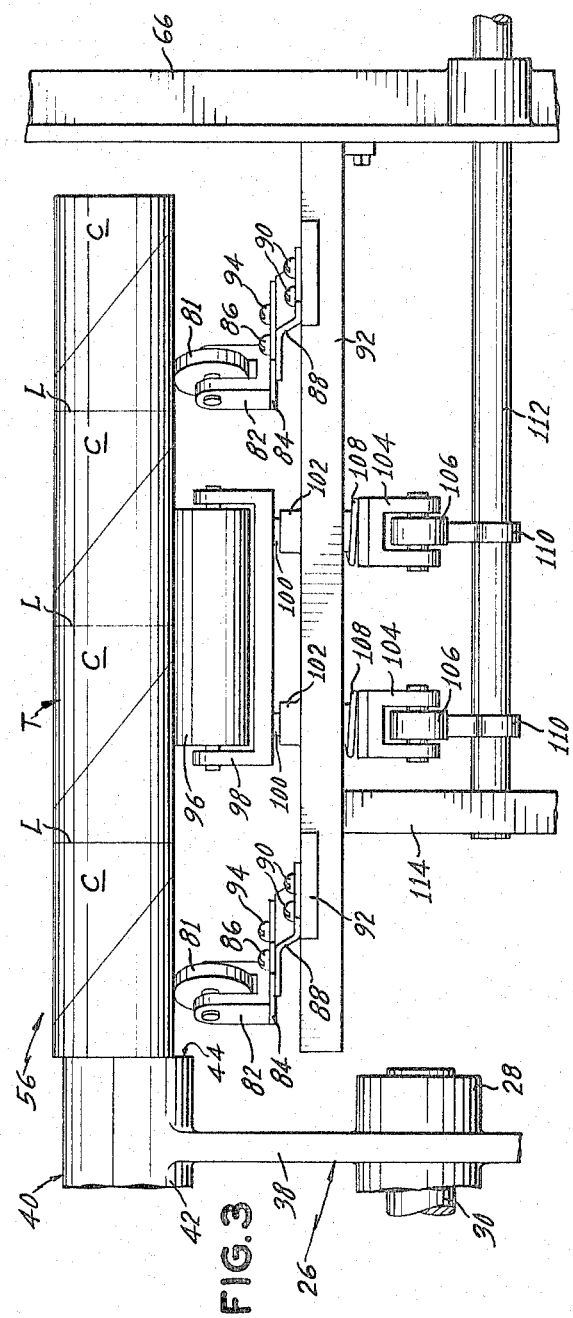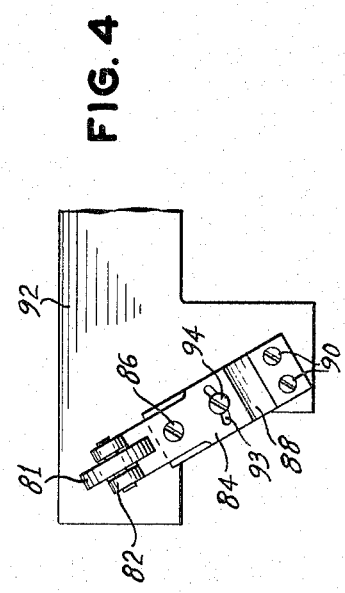

3,302,500
ARTICLE POSITIONING APPARATUS
Robert Ronald Hackenberger, Mexico, Leon Eugene Hackenberger, Thompsontown, and Horace Clayton Fritz, Jr., Duncannon, Pa., assignors to American Can Company, New York, N.Y., a corporation of New Jersey
Filed June 24, 1964, Ser. No. 377,764
4 Claims. (Cl. 82—97)

The present invention relates to the positioning of an article in a cutting or other type of machine, and more particularly to apparatus for maintaining a tubular article in a predetermined position on a mandrel as it enters the cutting station of the machine to insure that the tube is accurately cut into a predetermined number of container bodies.

In the feeding of spirally wound or other type of fiber tubes to a tube cutting machine, the tubes normally are fed, one at a time, from a feed table into a feed trough of the cutting machine. As each tube enters the feed trough, it is engaged by a pusher device and advanced axially in the trough onto one end of a mandrel or cylindrical supporting member in alignment therewith and having a diameter slightly smaller than the inside diameter of the tube. The mandrel is rotatably mounted at the other end on a rotatable turret member, and the leading end of the tube engages a portion of the turret member adjacent the other end of the mandrel which acts as a gauge to stop the axial movement of the tube and to position it on the mandrel. The turret member then is rotated through a predetermined angle to advance the mandrel and the tube thereon to the cutting station of the machine where the tube is engaged by cutting members and severed into separate container bodies of a predetermined length.

It is imperative, therefore, that the tube on the mandrel be maintained in a gauged position against the adjacent portion of the turret member when it is advanced into the cutting station of the machine so that the tube may be cut accurately along predetermined lines of severance therein. It is possible, however, for the leading end of the tube to bounce slightly in the opposite direction when the tube is originally advanced onto the mandrel and into engagement with the gauging portion of the turret member, or for the tube to be not fully advanced by the pusher device onto the mandrel, and thus the tube would be finally positioned on the mandrel in spaced relation to the gauging portion of the turret member, with the result that the tube would be disposed in an inaccurate cutting position on the mandrel. Also, during rotation of the turret member towards the cutting station of the machine, it is possible for the tube to shift axially on the mandrel in a direction away from the gauging portion of the turret member so as to be in an inaccurate cutting position on the mandrel as it reaches the cutting station, even though the tube was orginally in a proper gauged position when advanced onto the mandrel from the feed trough. If any of the above possibilities occurs, it is obvious that the tubes will be in an improper cutting position on the mandrel when it approaches the cutting station and thus the tube will be inaccurately severed at the cutting station, which could result in costly spoilage of the container bodies cut from the tube.

The instant invention provides apparatus for effectively urging the tube on the mandrel into the proper cutting position wherein it is in engagement with the gauging portion of the turret member and for maintaining the tube in the gauged position during the cutting operation at the cutting station of the machine, thereby insuring the accurate cutting of the tube into container bodies of a predetermined length. This is accomplished by providing one or more skew rollers adjacent the cutting station which are so disposed as to engage the outer surface of the tube on the mandrel as it approaches the cutting station of the machine and as the mandrel and tube are being rotated on the turret member. Each of the skew rollers is rotatably mounted on the free end portion of a flexible and resilient spring or plate member which serves to urge the roller against the outer surface of the tube as it approaches the cutting station. Each of the skew rollers and plate members is mounted to extend towards the turret member and is disposed in oblique relation to the longitudinal axis of the tube on the mandrel approaching the cutting station, so as to urge the tube on the mandrel into engagement with the gauging portion of the turret member as the tube is rotating and enters the cutting station.

These skew rollers, therefore, serve to axially move the tube on the rotating mandrel into a gauged position against the adjacent portion of the turret member prior to the cutting operation, or, if the tube is in the proper gauged position as it approaches the cutting station, the skew rollers engage the tube and maintain it in the proper gauged position. Since the skew rollers are rotatably mounted and are flexibly and resiliently urged against the tube in the cutting station, they do not interfere with the rotary movement of the tube during the cutting operation, but merely serve to insure that the tube is in the proper or gauged axial position prior to the cutting operation.

It is accordingly an object of the present invention to provide apparatus for urging an article toward a gauged or predetermined position prior to the performing of a predetermined operation thereon.

It is another object to provide apparatus for axially urging a tube on a mandrel to a predetermined operation on the tube.

A further object is to provide apparatus for insuring that the tube is in a predetermined, gauged, axial position on a mandrel prior to the cutting of the tube into container bodies in the cutting station of a tube cutting machine.

Still another object is to provide such an apparatus that does not interfere with the rotation of the tube during the cutting operation.

A still further object is the provision of apparatus which is rotatable and flexibly and resiliently mounted for engaging the outer surface of a tube on a mandrel as it is being advanced on a turret member to the cutting station of a tube cutting machine, the apparatus serving to urge the tube toward the gauged position against the adjacent portion of the turret member as the tube approaches the cutting station to insure the accurate severing of tube into container bodies of a predetermined length.

Numerous other objects and advantages of the present invention will be apparent as it is better understood from the following description, which, taken in connection with the accompanying drawings, discloses a preferred embodiment thereof.

Referring to the drawings:

FIGURE 1 is a plan view of tube handling and cutting apparatus constructed according to the principles of the instant invention;

FIGURE 2 is an enlarged sectional view taken substantially along line 2—2 of FIG. 1;

FIGURE 3 is an enlarged elevational view taken substantially along line 3—3 of FIG. 1, showing the apparatus for urging and maintaining each tube in a predetermined or gauged position prior to and during the cutting operation; and FIGURE 4 is a plan view of a portion of the tube positioning apparatus shown in FIG. 3.

As a preferred or exemplary embodiment of the instant invention, FIG. 1 illustrates apparatus 10 for handling and cutting spirally wound or other type tube sections T of fibre or other materials. Each of the tube sections T comprises a predetermined number of container bodies C separated by lines of potential severance L which may be printed on the tube T. The tube sections T are fed, one at a time, from an inclined feed table 12 into an elongated, generally V-shaped feed trough 14 in any suitable manner (see FIG. 2). Extending upwardly through a longitudinal slot 16 in the feed trough 14 is a reciprocable pusher device or plate 18 of any suitable construction which is provided with one or more bearing members 20 that are slidably mounted on rigid shafts 22. The pusher plate 18 is slidably reciprocated by any suitable means (not shown) to engage the adjacent end portion of each tube section T in the feed trough 14 and to advance it axially onto the adjacent one of four mandrels 24 mounted on a rotatable turret member 26 and in longitudinal alignment therewith (see FIG. 1).

As shown in FIGS. 1 through 3, the turret member 26 is provided with a hub 28 that is keyed to a central shaft 30 which in turn is rotatably mounted within bearing members 32, 34 rigidly mounted on a supporting frame 36. The shaft 30 is intermittently rotated by any suitable or conventional drive means (not shown), and the rotary movement of the turret member 26 is synchronized with the reciprocation of the pusher plates 18 in any suitable manner such that each of the mandrels 24 is moved into predetermined longitudinal alignment with the feed trough 14 to slidably receive thereon the tube section T being advanced axially out of the trough 14 by the pusher plate 18.

Extending radially outwardly from the hub 28 of the turret member 26 and rigidly connected thereto or formed integral therewith are four arms 38 spaced approximately 90° apart (see FIG. 2). Each of the arms 38 terminates at its outer end in a bearing member 40, the inner half 42 of which is enlarged to form a gauge shoulder 44 (see FIG. 3) which is engageable by the front end of a tube section T. The bearing member 40 is formed with a central bore 46. Each of the mandrels 24 has a reduced end portion 48 which is rotatably mounted within the central bore 46 of the corresponding bearing member 40. Each mandrel end portion 48 extends completely through the corresponding bore 46 and is connected by a pin 50 to the hub 52 of a roller or pulley 54, the purpose of which will be described more fully hereinafter.

As each tube section T is advanced by the pusher plate 18 out of the feed trough 14 and onto the adjacent mandrel 24, the leading end of the tube section T engages the shoulder 44 of the enlarged inner section 42 of the adjacent bearing member 40 which serves to gauge or position the tube section T on the mandrel 24. The tube section T then is completely supported by the mandrel 24 and is fully moved from the feed trough 14. Thereafter, the turret member 26 is rotated in a counterclockwise direction (as seen in FIG. 2), and the pusher plate 18 is slidably moved towards the opposite end of the feed trough 14 (to the right as seen in FIG. 1) so that another tube section T may be received in the feed trough 14 from the feed table 12.

The tube section T and the mandrel 24 supporting it are moved by the turret member 26 through approximately 90° in a counterclockwise direction to a cutting station 56 wherein a plurality of cutting knives 58 are so positioned with respect to the tube section T as to be adapted to cut it into separate container bodies C along the lines of severance L (see FIG. 1). Each of the rotary cutting knives 58 is rotatably mounted on an arm 60 rigidly secured to a hub 62 which is in turn secured to a shaft 64 (see FIGS. 1 and 2). The shaft 64 is rotatably mounted at one end on a supporting frame 66 and at the other end on the supporting frame 36. The other end of the rotatable shaft 64 has rigidly secured thereto the hub portion 68 formed on one end of the bracket 70. The other end of the bracket 70 is adapted to cooperate with a suitable cam or other type control mechanism (not shown) for causing the bracket 70 and thus the cutting knives 58 to oscillate into and out of engagement with the tube section T in the cutting station 56 at predetermined times.

In order to rotate each mandrel 24 and thus the tube section T mounted thereon before the cutting knives 58 contact the tube section T at the cutting station 56, a drive belt 72 (see FIGS. 1 and 2) is mounted on a pair of rollers 74 and 76 which are secured to shafts 78 and 80, respectively, which in turn are rotatably mounted on the supporting frame 36. The shaft 80 is rotatably driven by any suitable means (not shown) and thus the drive belt 72 is constantly rotated in a clockwise direction (as seen in FIG. 2) on the rollers or pulleys 74 and 76. The lower portion of the drive belt 72 is so positioned as to be engaged by the roller or pulley 54 secured to the end portion 48 of each mandrel 24 as the mandrel and tube section T thereon are moved by the turret member 26 toward the predetermined cutting position seen in FIG. 2. When the roller 54 engages the lower portion of the drive belt 72, the roller 54 is rotated in a counterclockwise direction (as seen in FIG. 2) to thus rotate both the mandrel 24 and the tube section T thereon in a counterclockwise direction.

After the roller 54 engages the drive belt 72 and before the mandrel 24 and tube section T thereon reach the predetermined cutting position at the cutting station 56, the lower portion of the outer surface of the tube section T is engaged by a pair of free-wheeling skew rollers 81 which are disposed in oblique relation to the longitudinal axis of the tube section T (see FIGS. 3 and 4). Each of the rollers 81 is rotatably mounted on a generally U-shaped support member 82 which in turn is secured to the free end of a plate 84 extending laterally towards the turret member 26. The plate 84 is pivotally mounted at 86 on the upper portion of a flexible and resilient angle plate 88 which in turn is rigidly secured by bolts 90 to a support plate 92 secured to the supporting frame 66. The plate 84 is provided with an arcuate slot 93 (see FIG. 4) in which a screw 94 is disposed for locking the plate 84 in a predetermined position on the angle plate 88. It will be readily seen, therefore, that the angle of each of the skew rollers 81 with respect to the longitudinal axis of the adjacent tube section T may be readily varied within the limits of the slot 93 in plate 84. Also, since the angle plates 88 are flexible and resilient, they provide the equivalent of leaf spring mountings for the skew rollers 81 which initially hold the rollers 81 in the path of travel of the tube sections T and are depressed when the rollers 81 engage the tube sections T and are pressed downwardly to a slight extent by it. Thus, the plates 88 hold the skew rollers 81 in pressured engagement with the tube sections T.

As the tube section T on each mandrel 24 engages the sker rollers 81 and is being rotated in a counterclockwise direction by the drive belt 72, the rotating tube section T causes the skew rollers 81 to rotate and the rotating skew rollers 81 urge the tube section T forwardly along the mandrel 24 into contact with the gauging shoulder 44 of the adjacent bearing member 40 on the turret member 26. Each tube section T, therefore, is urged by the skew rollers 81 into a fully gauged position against the bearing member 40 and held in such fully gauged position prior to the cutting operation at the cutting station 56, thereby insuring that the cutting knives 58 will be in registration with the lines of severance L of each tube section T when they become operative. In the event that the tube section T should be in contact with the gauging shoulder 44 of the bearing member 40 at the time it engages the skew rollers 81, there will of course be no forward movement of the tube section T relative to the mandrel 24. However, whether section T will be moved or not, the rollers 81 will positively maintain it against the bearing member 40.

After the tube section T has been fully gauged at the cutting station 56 by the skew rollers 81, the lower portion of the tube section T is engaged by a pressure roller 96 (see FIGS. 2 and 3) which firmly grips the tube section T to maintain it in the gauged position in engagement with the adjacent bearing member 40 and thus in a constant axial position on the mandrel 24 during the cutting operation. It will be understood that once the roller 96 becomes operative, the skew rollers 81, which exert less pressure on the tube section T, become ineffective. Thus, it is essential that the gauging operation be completed prior to the time the pressure roller 96 grips the tube section T.

The roller 96 is rotatably mounted on a U-shaped bracket 98 which has rigidly secured thereto a pair of depending rods 100 extending through bearing members 102 in the support plate 92. Each of the rods 100 is secured at its lower end to a U-shaped bracket 104 on which is rotatably mounted a roller 106. A coil spring 108 surrounds the lower portion of each of the rods 100 and is disposed between the support member 92 and the corresponding U-shaped bracket 104 to normally urge the roller 96 downwardly out of contact with the tube section T when it is in the cutting station 56. A pair of cam members or rollers 110 are disposed in engagement with the rollers 106 and are rigidly secured to a shaft 112 which is rotatably mounted at one end in a generally vertical support plate 114 secured to the support plate 92, and at the other end of the shaft 112 is rotatably mounted on the support plate 66. The shaft 112 is rotatably driven in any suitable manner and at a suitable speed to bring the high points of the cam members 110 into engagement with the rollers 106 to move the roller 96 upwardly against the force of the springs 108 into engagement with each tube section T when it has reached the predetermined cutting position at the cutting station 56. The roller 96 thus serves to positively maintain each tube section T in the gauged position on the mandrel 24 during the cutting operation, and also serves to hold the tube section T in pressured engagement with the rotating mandrel 24 to insure that the tube section T continues its rotation during the tube cutting operation which will now be described.

When each mandrel 24 and the tube section T thereon reaches the predetermined cutting position shown in FIGS. 1 and 3 and the roller 96 is moved upwardly into engagement therewith, the bracket 70 is rotated in a clockwise direction (as seen in FIG. 2) to rotate the shaft 64 and to move the cutting knives 58 thereon into engagement with the lines of severance L on the tube section T. The turret member 26 will remain stationary for a period of time sufficient for the tube section T at the cutting station 56 to be rotated through approximately 360° by the drive belt 72 so that the knives 58 will completely sever the tube section T along the lines of severance L into separate container bodies C. Any tendency of the tube section T to stop rotating because of the pressure of the knives 58 is overcome by the pressured engagement of the tube section T between the rotating mandrel 24 and the pressure roller 96.

When the cutting operation is completed, the cutting knives 58 are moved in a counterclockwise direction away from the container bodies C on the mandrel 24, and the turret member 26 is again rotated in a counterclockwise direction through an angle of approximately 90° to move the severed tube section T or container bodies C on the mandrel 24 to an exit station 116 (see FIGS. 1 and 2). At the exit station 116, a pusher member 118, mounted on a moving endless chain 120 supported on a drive sprocket 122 and an idler sprocket 124, engages the end portion of the innermost container body C disposed adjacent and in contact with the bearing member 40 and axially advances the container bodies C of the mandrel 24 onto a conveyor belt 126. The conveyor belt 126 moves the container bodies C to apparatus for performing other operations thereon, such as end flanging and seaming or the like.

It is noted that the instant tube positioning apparatus may be utilized to accurately position tubular articles of any suitable type in any type of machine other than a cutting machine, without departing from the spirit and scope of the instant invention. Also, the skew rollers 81 of the instant apparatus may be rotatably and adjustably mounted on any suitable type of flexible and resilient spring members other than the plates 84 and 88 disclosed herein. Furthermore, while a pair of skew rollers 81 are disclosed herein, it is obvious that any suitable number could be utilized, depending on the length of the tubular article and other factors.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:
1. Apparatus for cutting a cylindrical tubular article into several container bodies comprising a cylindrical mandrel, said mandrel having an outside diameter slightly smaller than the inside diameter of said tubular article, means to move said article axially and onto said mandrel, gauging means adjacent to one end of said mandrel for engaging the leading end of said article and positively positioning said article with respect to said mandrel, means for rotating said mandrel and said article thereon, a plurality of cutting knives having cutting edges extending perpendicularly to the longitudinal axis of said mandrel for cutting said article into several container bodies, a skew roll rotatably mounted with its axis of rotation lying at an obtuse angle to said mandrel, said skew roll being spring biased against the outer surface of said article to urge said article against said gauging means when said mandrel and said article are rotated.

2. The apparatus defined in claim 1 wherein at least one additional skew roll is rotatably mounted with its axis lying at an obtuse angle to said mandrel, said one or more additional skew rolls being spring biased against the outer surface of said article to urge said article against said gauging means when said mandrel and said article are rotated.

3. The apparatus defined in claim 1 wherein said cutting knives are rotary knives, the axes of which are parallel to the axis of said mandrel.

4. The apparatus defined in claim 3 wherein a pressure roller is rotatably mounted with its axis parallel to said mandrel and wherein cam means are provided to push said roller against said article in rolling contact therewith after said article has been positively positioned by said skew roller and said gauging means.

References Cited by the Examiner
UNITED STATES PATENTS

| | | | |
|---|---|---|---|
| 1,006,574 | 10/1911 | Lorenz | 82—101 X |
| 2,298,366 | 10/1942 | Gladfetter | 82—101 X |
| 2,341,025 | 2/1944 | Duncan | 82—101 X |
| 3,230,804 | 1/1966 | Pezzoli | 82—85 |

WILLIAM W. DYER, Jr., *Primary Examiner.*

HARRISON L. HINSON, *Examiner.*